(12) United States Patent
Donnelly et al.

(10) Patent No.: US 12,246,851 B2
(45) Date of Patent: Mar. 11, 2025

(54) SYSTEMS AND METHODS FOR MONITORING IMPACT ON AIRCRAFT

(71) Applicant: BETA AIR LLC, South Burlington, VT (US)

(72) Inventors: Richard Donnelly, South Burlington, VT (US); Edward Hall, Starksboro, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/427,473

(22) Filed: Jan. 30, 2024

(65) Prior Publication Data
US 2024/0367814 A1 Nov. 7, 2024

Related U.S. Application Data

(63) Continuation of application No. 17/563,448, filed on Dec. 28, 2021, now abandoned.

(51) Int. Cl.
*B64D 45/04* (2006.01)
*B64C 25/28* (2006.01)
(Continued)

(52) U.S. Cl.
CPC .............. *B64D 45/04* (2013.01); *B64C 25/28* (2013.01); *B64C 25/30* (2013.01); *B64C 29/00* (2013.01);
(Continued)

(58) Field of Classification Search
CPC .. B64D 45/04; B64D 27/24; B64D 2045/008; B64C 25/28; B64C 25/30; B64C 29/00
See application file for complete search history.

(56) References Cited

U.S. PATENT DOCUMENTS

| | | |
|---|---|---|
| 6,577,947 B1 | 6/2003 | Kronfeld et al. |
| 7,274,310 B1 | 9/2007 | Nance |

(Continued)

FOREIGN PATENT DOCUMENTS

| | | |
|---|---|---|
| BR | 112021010366 A2 | 8/2021 |
| CA | 2509742 A1 | 12/2006 |

(Continued)

OTHER PUBLICATIONS

Qiu, Lei , et al., "Impact Monitoring for Aircraft Smart Composite Skins Based on a Lightweight Sensor Network and Characteristic Digital Sequences", Sensors, Jul. 10, 2018, 27 pages.

*Primary Examiner* — Donald J Wallace
*Assistant Examiner* — Jalal C Coduroglu
(74) *Attorney, Agent, or Firm* — Brake Hughes Bellermann LLP

(57) ABSTRACT

A system for monitoring impact on an electric aircraft is presented. The system includes a sensor communicatively connected to a flight component, wherein the sensor is configured to detect a measured force datum and generate an impact datum as a function of the measured force datum. The system further includes a computing device configured to simulate a landing performance model output as a function of the impact datum, generate a landing performance datum as a function of a comparison between the landing performance model output, determine an alert datum as a function of the landing performance datum, and display the landing performance datum on a user device.

20 Claims, 8 Drawing Sheets

(51) Int. Cl.
  *B64C 25/30* (2006.01)
  *B64C 29/00* (2006.01)
  *B64D 27/24* (2024.01)
  *B64D 45/00* (2006.01)
(52) U.S. Cl.
  CPC ........ *B64D 27/24* (2013.01); *B64D 2045/008* (2013.01)

(56) References Cited

U.S. PATENT DOCUMENTS

| | | |
|---|---|---|
| 7,589,645 B2 | 9/2009 | Schmidt |
| 9,327,842 B2 | 5/2016 | Khial et al. |
| 9,440,747 B1 | 9/2016 | Welsh et al. |
| 10,625,876 B2 | 4/2020 | Bosworth |
| 10,725,480 B2 | 7/2020 | Bosworth |
| 10,800,508 B2 | 10/2020 | Gendre et al. |
| 10,810,501 B1 | 10/2020 | Kimchi et al. |
| 11,180,253 B1 | 11/2021 | Seeley |
| 11,198,519 B1 | 12/2021 | Seeley |
| 11,440,678 B1 | 9/2022 | Wiegman |
| 2003/0093187 A1 | 5/2003 | Walker |
| 2004/0002796 A1 | 1/2004 | Shimel |
| 2005/0251306 A1 | 11/2005 | Gowan et al. |
| 2006/0220917 A1 | 10/2006 | Nance |
| 2006/0284008 A1 | 12/2006 | Nance |
| 2007/0008187 A1* | 1/2007 | Schmidt ............ B64C 25/001 340/970 |
| 2008/0114506 A1 | 5/2008 | Davis et al. |
| 2009/0105874 A1 | 4/2009 | Tietjen et al. |
| 2012/0095622 A1* | 4/2012 | Lynch ................ G07C 5/08 701/3 |
| 2013/0197721 A1* | 8/2013 | Gu ..................... B64D 45/00 701/3 |
| 2014/0222401 A1 | 8/2014 | Heinzerling |
| 2015/0269794 A1* | 9/2015 | Fazeli ................. B64C 25/60 701/34.4 |
| 2017/0088284 A1* | 3/2017 | Holder ............... B64D 45/00 |
| 2017/0148340 A1 | 5/2017 | Popa-Simil et al. |
| 2017/0345318 A1* | 11/2017 | Kim .................... G08G 5/0013 |
| 2018/0079530 A1 | 3/2018 | Wyrobek |
| 2018/0170529 A1 | 6/2018 | Schmidt |
| 2018/0222580 A1 | 8/2018 | Delorean |
| 2018/0346151 A1* | 12/2018 | Sturlaugson ........ G06N 20/20 |
| 2019/0077517 A1* | 3/2019 | Kneuper ............. B64D 45/00 |
| 2019/0304322 A1 | 10/2019 | Delisle et al. |
| 2019/0315485 A1 | 10/2019 | Bolukbasi |
| 2020/0143092 A1 | 5/2020 | Lamontagne et al. |
| 2020/0168108 A1* | 5/2020 | Letsu-Dake ........ G08G 5/0013 |
| 2020/0180781 A1* | 6/2020 | McKeown ........... B64D 45/08 |
| 2020/0264635 A1 | 8/2020 | Wilson |
| 2020/0357287 A1 | 11/2020 | Collins |
| 2021/0070179 A1 | 3/2021 | Wiegman |
| 2021/0070457 A1 | 3/2021 | Wiegman |
| 2021/0216085 A1 | 7/2021 | Wake et al. |
| 2021/0264798 A1 | 8/2021 | B et al. |
| 2021/0271264 A1 | 9/2021 | Oflaherty et al. |
| 2021/0335137 A1 | 10/2021 | Candido |
| 2021/0339882 A1 | 11/2021 | Ferrier et al. |
| 2022/0028287 A1 | 1/2022 | Durant et al. |
| 2022/0204180 A1* | 6/2022 | Sellmann ........... G01C 23/005 |

FOREIGN PATENT DOCUMENTS

| | | |
|---|---|---|
| DE | 102004020282 A1 | 7/2006 |
| DE | 102008003498 A1 | 7/2009 |
| EP | 2557542 A2 | 2/2013 |
| EP | 3608224 A1 | 2/2020 |
| GB | 2470100 A | 11/2010 |
| GB | 2563948 A | 1/2019 |
| GB | 2580954 A | 8/2020 |
| GB | 2581830 A | 9/2020 |
| RU | 2703325 C1 | 10/2019 |
| WO | 2011016857 A2 | 2/2011 |
| WO | 2016062897 A1 | 4/2016 |
| WO | 2017162197 A1 | 9/2017 |
| WO | 2021070517 A1 | 4/2021 |
| WO | 2021118925 A1 | 6/2021 |

* cited by examiner

SYSTEMS AND METHODS FOR MONITORING IMPACT ON AIRCRAFT

RELATED APPLICATION

This application is a continuation of, and claims priority to, U.S. application Ser. No. 17/563,448. Filed Dec. 28, 2021, titled "SYSTEMS AND METHODS FOR MONITORING IMPACT ON ELECTRIC AIRCRAFT," the disclosure of which is incorporated herein by reference in its entirety.

FIELD OF THE INVENTION

The present invention generally relates to the field of electric aircraft. In particular, the present invention is directed to systems and methods for monitoring impact on electric aircraft.

BACKGROUND

Although landing of a flying vehicle is usually the final stage of a flight, it is arguable the most crucial stage in ensuring the completion of a flight. The mechanical components involved in ensuring an electric aircraft lands successfully are crucial. Throughout an electric aircraft's lifecycle, those mechanical parts may experience wear and tear, in which poorly maintained and monitored performances of those mechanical parts may lead to potentially hazardous incidents involving the electric aircraft.

SUMMARY OF THE DISCLOSURE

In an aspect, a system for monitoring impact on an electric aircraft is presented. The system includes a sensor communicatively connected to a flight component, wherein the sensor is configured to detect a measured force datum and generate an impact datum as a function of the measured force datum. The system further includes a computing device configured to simulate a landing performance model output as a function of the impact datum, generate a landing performance datum as a function of a comparison between the landing performance model output, determine an alert datum as a function of the landing performance datum, and display the landing performance datum on a user device.

In another aspect, a method for monitoring impact on an electric aircraft is presented. The method includes detecting, by a sensor communicatively connected to a flight component, a measured force datum, generating an impact datum as a function of the measured force datum, simulating, by a computing device, a landing performance model output as a function of the impact datum, generating a landing performance datum as a function of a comparison between the landing performance model output, determining an alert datum as a function of the landing performance datum, and displaying the landing performance datum on a user device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
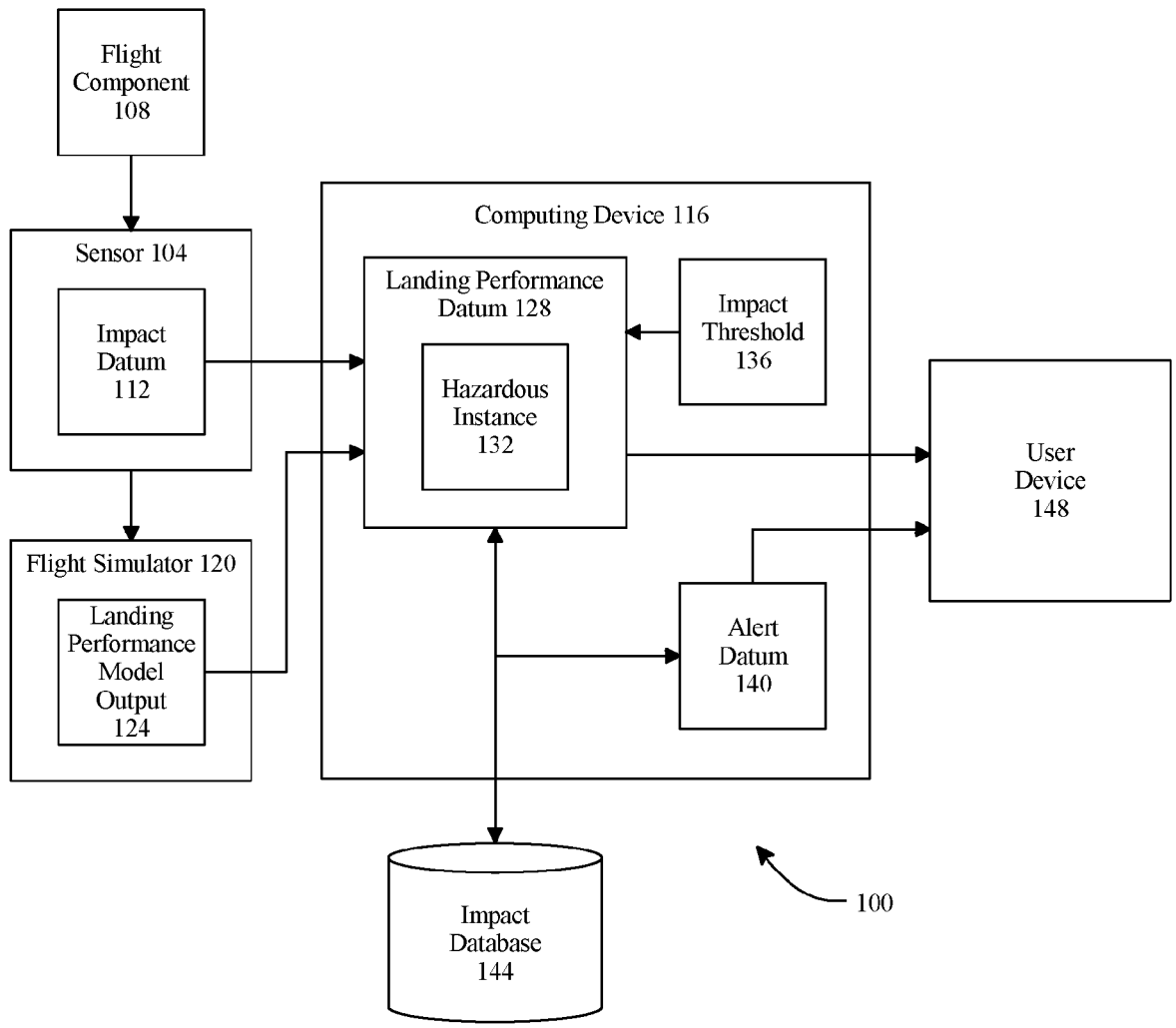
FIG. 1 is a block diagram of an exemplary embodiment of a system for monitoring impact on an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for monitoring impact on an electric aircraft. In an embodiment, the electric aircraft may include an electric vertical take-off and landing (eVTOL) aircraft. In an embodiment, sensors may be connected to the actuators of the electric aircraft such as the landing gears. The landing gears may include wheels, skids, or any mechanism that absorbs the force of the electric aircraft when landing on a surface. Aspects of the present disclosure can be used to measure force or strain of the landing gears of the electric aircraft. This is so, at least in part, to identify the health status of the landing gears of the electric aircraft and determine the flight safety of the electric aircraft. In another embodiment, aspects of the present disclosure can include using sensors to detect the landing zone of the electric aircraft to determine or predict the level of force and/or damage the landing gears of the electric aircraft may endure. This is so, at least in part, wherein the electric aircraft may land on unregulated landing destinations without landing pads for the electric aircraft to land on. The electric aircraft may be required to make emergency or impromptu landings on uneven or dangerous terrain. In another embodiment, aspects of the present disclosure may alert or notify a user or pilot of damaged or degraded landing gears requiring imminent attention. This is so, at least in part, for the pilot for the pilot to be alerted of the potential dangers that may be resulted from the degraded landing gears and act appropriately. In some embodiments, the computing device may automatically program the electric aircraft to land at a landing pad closest to its location for immediate maintenance of the landing gears. In another embodiment, the computing device may generate a trigger for some emergency response that the pilot may initiate to safely land the electric aircraft. In another embodiment, a remotely located user utilizing a remotely located user device may do the same things as described above.

Aspects of the present disclosure can also be used to determine whether the landing gears of the present disclosure are safe enough to either continue operations or require replacement/repairs. This is so, at least in part, to ensure the following flights of the electric aircraft with damaged or degraded landing gears can be resolved prior to the electric aircraft taking flight. Aspects of the present disclosure can also be used to generate predictive models to determine the level of danger the landing gears of an electric aircraft poses based on the performance and status of the landing gears from previous flights and landings. In an embodiment, a computing device may compare the landing data to previous landing data of the electric aircraft. The computing device may detect some discrepancies or level of change in performance qualities of the landing gears from previously collected data to accurately predict the future performance quality of the landing gears. This is so, at least in part, for the computing device to discern whether or not the landing gears are more prone to serious damage or cause serious damage. The previously collected data may be retrieved from a local/cloud database wherein the computing device records every landing data from every flight/landing of the electric aircraft in order to create a robust database for further data analysis and manipulation. The computing device may incorporate any machine-learning models. In another embodiment, the sensors can detect the force exerted or absorbed by the landing gears during take-off to further determine the landing safety of the electric aircraft, even during mid-flight. Aspects of the present disclosure can be used to analyze sensor data to determine landing safety of the electric aircraft and its landing gears during any stage or flight phase of the electric aircraft.

Aspects of the present disclosure can be used to monitor the landing of the electric aircraft as well as the data collected by its sensors via a user device. In an embodiment, the user device may be remotely located from the electric aircraft and used to analyze data collected by the sensors of the electric aircraft. This is so, at least in part, for a user such as a fleet manager to view the performances and health status of the electric aircraft and its flight components in a safe location. Aspects of the present disclosure can also be used to monitor the landing of the aircraft as well as its data via a user device located inside the electric aircraft. The user device may include a pilot device such as a multi-function display integrated into the cockpit of the electric aircraft and its flight instruments. This is so, at least in part, for the pilot to also monitor and analyze the data collected by its sensors and pilot the electric aircraft accordingly. In some embodiments, the pilot may discover some potential danger as a result of the degradation of the landing gears and maneuver the electric aircraft adaptively based on the data. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," "inner," "outer," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, an exemplary embodiment of a system 100 for monitoring impact on an electric aircraft is illustrated. In a non-limiting embodiment, system 100 may include any electric aircraft such as an eVTOL, an unmanned aerial vehicle (UAV), a drone, an electric helicopter, and the like thereof. The electric aircraft includes a flight component 108. A "flight component," as used in this disclosure "flight component" is a portion of an aircraft that can be moved or adjusted to affect one or more flight elements. In some embodiments, flight component 108 may include electric motors, electric propulsors, electric propulsion systems, wings, alerions, rudders, forward pushers, propellers, etc. In a non-limiting embodiment, flight component 108 may include a landing gear. A "landing gear," as used in this disclosure, is an undercarriage of an electric aircraft used to support take-off and/or landing of the electric aircraft. The landing gear may include skis, floats, wheels, skids, and the like thereof. The landing gear may include retractable gears and shock absorbers.

With continued reference to FIG. 1, sensor 104 may be communicatively connected to flight component 108. A "sensor," for the purposes of this disclosure, is an electronic device configured to detect, capture, measure, or combination thereof, a plurality of external and electric aircraft component quantities. Sensor 104 may include any computing device as described in the entirety of this disclosure and configured to convert and/or translate a plurality of signals detected into electrical signals for further analysis and/or manipulation. In a non-limiting embodiment, sensor 104 may include a plurality of sensors comprised in a sensor suite. For example and without limitation, sensor 104 may include flow sensors, temperature sensors, altimeters, pressure sensors, proximity sensors, airspeed indicators, position sensors, global positioning system (GPS), humidity sensors, level sensors, gas sensors, wireless sensor networks (WSN), compasses, magnetometers, altitude heading and reference systems (AHRSes), tachometers, etc. In a non-limiting embodiment, sensor 104 may be communicatively connected to the electric aircraft of system 100. As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. Persons skilled in the art, upon reviewing the entirety of this disclosure, will be aware of the various embodiments of controlling a cursor for visual data manipulation for purposes as described herein. Persons skilled in the art, upon reviewing the entirety of this disclosure, will also be aware of the various warning symbols that may be employed to grab the attention of a pilot in the context of simulation consistently described in the entirety of this disclosure.

With continued reference to FIG. 1, sensor 104 may include a motion sensor. A "motion sensor," for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, and the like. In a non-limiting embodiment, sensor 104 may use of active range finding methods which may include, but not limited to, light detection and ranging (LIDAR), radar, sonar, ultrasonic range finding, forward-looking infrared (FLIR) cameras, enhanced vision systems (EVS), short wave infrared (SWIR) imagers, or the like thereof.

With continued reference to FIG. 1, sensor 104 may include a three-dimensional (3D) scanner. 4D scanner may include the use of 4D laser scanning. 4D Laser Scanning is a non-contact, non-destructive technology that digitally captures the shape of physical objects using a line of laser light. 4D laser scanners create "point clouds" of data from the surface of an object. In other words, 4D laser scanning is a way to capture a physical object's exact size and shape into the computer world as a digital 4-dimensional representation. 4D laser scanners measure fine details and capture free-form shapes to quickly generate highly accurate point clouds. 4D laser scanning is ideally suited to the measurement and inspection of contoured surfaces and complex geometries which require massive amounts of data for their accurate description and where doing this is impractical with the use of traditional measurement methods or a touch probe. In a non-limiting embodiment, a 4D scanner may capture a potential landing zone and generate a 4D model of a plot representing the landing zone for analysis described later in the disclosure.

With continued reference to FIG. 1, sensor 104 may be configured to detect and/or determine a plurality of ranges of an object with a laser. Determining ranges may include a technique for the measuring of distances or slant range from an observer including at least a sensor 104 to a target which may include a potential landing zone. A "potential landing zone," as used in this disclosure, is one or more options denoting a landing destination for the electric aircraft. The potential landing zone may include any area encompassing a surface for the electric aircraft to land on. The potential landing zone may include any infrastructure to support the electric aircraft such as landing pad, launch pad, charging station, and the like thereof. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from sensor 104 to a potential landing zone. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may targe an object including a potential landing zone with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. In a non-limiting embodiment, the LIDAR may be used to measure the surface of the landing location of the electric aircraft wherein the data collected may be used to determine the potential damages, degradation, physical wear and tear, or the combination thereof, of flight component 108 and/or the landing gear of the electric aircraft. Persons skilled in the art, upon reviewing the entirety of this disclosure, will be aware of the using sensors to measure the qualities of the surface and environment for determining potential physical effects on the electric aircraft in the context of monitoring landing.

Still referring to FIG. 1, sensor 104 may be installed onto a plurality of flight instruments of the electric aircraft. As used in this disclosure, a "flight instrument," is defined as an instrument used to provide information involving the flight situation of an electric aircraft it is installed on. In some embodiments, the information of the flight situation may include, but not limited to, altitude, attitude, airspeed, vertical speed, heading, and the like thereof. Sensor 104 installed onto the flight instruments may include a gyroscope, a torque monitor, tachometers, engine temperature gauges, fuel- and oil-quantity gauges, pressure gauges, altimeters, airspeed-measurement meters, vertical speed indicators and/or combination thereof. In another embodiment, sensor 104 may include radars such as, doppler radars, lightning-detection radars, terrain radars, anti-collision warning systems, stall warning systems, etc. In a non-limiting embodiment, various types of sensor 104 may be used to inform the pilot of the electric aircraft or a user interacting with a remote device in communication with the electric aircraft to take proper action and precaution, and prevent any kind of disaster or accident. Any information captured by sensor 104 may be used for ground testing, flight testing, vibration, environment, angle of attack, static, and the like thereof. Sensor 104 may include a sensor suite which may include a plurality of sensors, wherein the sensors may include any sensor described herein.

With continued reference to FIG. 1, sensor 104 may be configured to detect measured aircraft data. A "measured aircraft data," for the purpose of this disclosure, are signals representing information captured by sensor 104 or any sensor as described in the entirety of this disclosure. In a non-limiting embodiment, the measured aircraft data may include temperature, voltage, wind resistance, pressure, speed, angles, acceleration, flight speed, flight angle, lag, thrust, lift, and the like thereof. Sensor 104 may also detect a plurality of maneuver data. A "plurality of maneuver data," for the purpose of this disclosure, is any collection of information describing completion by the pilot of procedures and concepts that control the electric aircraft, a simulated electric aircraft, and/or the simulator module. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

Still referring to FIG. 1, sensor 104 may be configured to identify a flight phase of the electric aircraft. As described in this disclosure, a "flight phase" is defined as a stage or period within a flight. In a non-limiting embodiment, the electric aircraft may undergo a plurality of different flight phases in the course of a completion of a flight. For example and without limitation, the flight phases may include a planning phase, lift-off/take-off phase, climb phase, cruise phase, descent phase, approach phase, taxi phase, hover phase, landing phase, and the like thereof. In an embodiment, sensor 104 may identify the flight phase of the electric aircraft as a function of the measured aircraft data, such as the plurality of maneuver data. In a non-limiting embodiment, the pilot of the electric aircraft may perform various flight maneuvers that result in the electric aircraft exerting power on various systems and flight components which is detected by sensor 104 and identify the flight phase the electric aircraft is currently in or performing. The pilot may perform the flight maneuvers using one or more pilot controls of the electric aircraft. Aa "pilot control," for the purpose of this disclosure, is an interactive mechanism or means which allows a pilot to control operation of flight components of an electric aircraft. In a non-limiting embodiment, the pilot control may be used by a pilot to manipulate and/or command the components of an electric aircraft. In a non-limiting embodiment, the pilot control may be communicatively connected to sensor 104 and receive a pilot input. A "pilot input" for the purpose of this disclosure, is as any gauge, throttle lever, clutch, dial, control, or any other mechanical or electrical device that is configured to be manipulated by a pilot to receive information. In a non-limiting embodiment, the pilot control may be physically located in the cockpit of the aircraft or remotely located outside of the aircraft in another location communicatively connected to at least a portion of the aircraft. The pilot control may include buttons, switches, or other binary inputs in addition to, or alternatively than digital controls about which a plurality of inputs may be received. In a non-limiting embodiment, the pilot input may include a physical manipulation of a control like a pilot using a hand and arm to push or pull a lever, or a pilot using a finger to manipulate a switch. In another non-limiting embodiment, the pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to sensor 104. In some cases, flight simulator 120, the physical cockpit, and the pilot control may include sensor 104 and/or be communicatively connected to sensor 104. In a non-limiting embodiment, sensor 104 may be communicatively connected to computing device 116. In some cases, sensor 104 may be configured to detect a user interaction with pilot control. Persons skilled in the art, upon reviewing the entirety of this disclosure, will be aware of the various embodiments and functions of the at least a pilot control for purposes as described herein.

Still referring to FIG. 1, sensor 104 may include a strain gauge. A "strain gauge," as used in this disclosure, is a sensing device and/or sensor used to measure strain on an object such as flight component 108 and/or the landing gear. for example and without limitation, the strain gauge may include any strain gauge such as, but not limited to, linear strain gauge, membrane rosette strain gauge, double linear strain gauge, shear strain gauge, column strain gauge, 45°-Rosette, 90°-Rosette, or combination thereof. In another non-limiting embodiment, the strain gauge may include piezoresistors, foil gauges, semiconductor strain gauge, fiber optic sensor vibrating wire strain gauges, and the like thereof. The stain gauge may include any impact sensor as described herein. In a non-limiting embodiment, the strain gauge may include any configuration such as quarter, half, full bridge, or combination thereof. The strain gauge may sense changes in strain on flight component 108 as it absorbs the impact during landing and/or take-off for an electric aircraft. The strain gauge may also measure, but not limited to, variation in pressure, strain, stress, temperature, or the combination thereof. In a non-limiting embodiment, a portion of flight component 108 may change in size as a function of thermal expansion which will be detected as a strain by the strain gauge. Resistance of the strain gauge will change due to the thermal expansion. In a non-limiting embodiment, the strain gauge may be self-temperature compensated. Persons skilled in the art, upon reviewing the entirety of this disclosure, will be aware of the various embodiments of a strain gauge in the context of monitoring impact of the electric aircraft when landing.

Still referring to FIG. 1, sensor 104 and/or the strain gauge may include at least a load cell. A "load cell," as used in this disclosure, is a force transducer configured to convert force such as tension, compression, pressure, and/or torque, into electrical signals for any computing device to translate and/or standardize the electrical signals for analysis. The at least a load cell may include a pneumatic load cell, hydraulic load cell, and the like thereof. In a non-limiting embodiment, the at least a load cell may include a plurality of types such as single point, planar beam, bending beam, sharing beam, dual shear beam, S-type, compression, ring torsion, spoke type, onboard, load pins, weigh pads, or combination thereof. Persons skilled in the art, upon reviewing the entirety of this disclosure, will be aware of the various configurations for a force measuring and converting sensor for purposes as described herein.

With continued reference to FIG. 1, sensor 104 may be configured detect measured state data. A "measured state data," as used in this disclosure, is a datum that is collected via a physical controller area network (CAN) bus unit describing a plurality of functionalities of the electric aircraft. A "physical controller area network bus," as used in this disclosure, is vehicle bus unit including a central processing unit (CPU), a CAN controller, and a transceiver designed to allow devices to communicate with each other's applications without the need of a host computer which is located physically at the electric aircraft. In a non-limiting embodiment, the electric aircraft may include a plurality of physical CAN bus units communicatively connected to the electric aircraft. For instance and without limitation, the physical CAN bus unit may be consistent with the physical CAN bus unit in U.S. patent application Ser. No. 17/218,312 and entitled, "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference herein in its entirety. In a non-limiting embodiment, the measured state data may include a plurality of data signals detailing a control to one or more actuators communicatively connected to the aircraft. Measured state data may include a plurality of data entries relating aircraft pitch, roll, yaw, torque, angular velocity, climb, speed, performance, lift, thrust, drag, battery charge, fuel level, location, and the like. Measured state data may include a plurality of data communicating the status of flight control devices such as proportional-integral-derivative controller, fly-by-wire system functionality, aircraft brakes, impeller, artificial feel devices, stick shaker, power-by-wire systems, active flow control, thrust vectoring, alerion, landing gear, battery pack, propulsor, management components, control surfaces, sensors/sensor suites, creature comforts, inceptor, throttle, collective, cyclic, yaw pedals, MFDs, PFDs, and the like. Measured state data may exist as analogue and/or digital data, originating from physical CAN bus units such as bits, where a series of serial binary data are composed and transmitted relaying a measured state as indicated from a device located within, on, or communicating with the electric aircraft.

Still referring to FIG. 1, sensor 104 may be configured to detect a measured force datum. A "measured force datum," as used in this disclosure, is an electrical signal describing information captured by sensor 104 and/or flight component 108. The measured force datum may include temperature, torque, force, pressure, velocity, and the like thereof. Sensor 104 may capture various significant data as described for the measured force datum. In a non-limiting embodiment, sensor 104 may generate an impact datum 112 as a function of the measured force datum. An "impact datum," as used in this disclosure, is a collection of information describing the performance and qualities of the electric aircraft and its flight components denoting a degree and/or any change of instantaneous force, torque, kinetic energy, pressure, experienced by the electric aircraft and its flight components during landing. Impact datum 112 may include information denoting the change in force and/or energy experience and/or natural force produced by the landing gear. For example and without limitation, impact datum 112 may include an indication of a hard landing. A "hard landing," as used in this disclosure, is a large amount of instantaneous force and/or energy received by the landing gear of the electric aircraft. In a non-limiting embodiment, a hard landing may include a determination of the landing of the electric aircraft in which the landing gear receives an instantaneous force reaching and/or exceeding an upper value/limit of impact threshold 136. In a non-limiting embodiment, impact datum 112 may include landing data, force magnitude data, altitude data, acceleration data, and the like thereof. Alternatively or additionally, impact datum 112 may include information captured by visual sensors used to detect visual data. For example and without limitation, impact datum 112 may include 3-D and/or 4-D representation of the potential landing zone of the electric aircraft in which sensor 104 may analyze and generate impact datum 112 aside from external forces. Persons skilled in the art, upon reviewing the entirety of this disclosure, will be aware of the various embodiments of generating a collection of data in the context of monitoring the landing of the electric aircraft.

With continued reference to FIG. 1, system 100 may include a computing device 116 communicatively connected to sensor 104. Computing device 116 may be configured to receive impact datum 112. In a non-limiting embodiment, computing device 116 may receive impact datum 112 via a plurality of physical CAN bus units. In some embodiments, computing device 116 may be remotely located from the electric aircraft. This is so, at least in part, to receive data, monitor the electric aircraft, and/or analyze data safely and continuously while the electric aircraft may undergo various flights or operations. In another embodiment, computing device 116 may be integrated within the electric aircraft. For example and without limitation, computing device 116 may include a flight controller. computing device 116 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 116 may include a single computing device operating independently, or may include two or more computing device operating in concert, in parallel, sequentially or the like; two or more computing devices may be included together in a single computing device or in two or more computing devices. computing device 116 may interface or communicate with one or more additional devices as described below in further detail via a network interface device. Network interface device may be utilized for connecting computing device 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device, computing device 116 may include but is not limited to, for example, a computing device or cluster of computing devices in a first location and a second computing device or cluster of computing devices in a second location. computing device 116 may include one or more computing devices dedicated to data storage, security, distribution of traffic for load balancing, and the like. computing device 116 may distribute one or more computing tasks as described below across a plurality of computing devices of computing device, which may operate in parallel, in series, redundantly, or in any other manner used for distribution of tasks or memory between computing devices. computing device 116 may be implemented using a "shared nothing" architecture in which data is cached at the worker, in an embodiment, this may enable scalability of system 100 and/or computing device.

With continued reference to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 116 may be configured to simulate a landing performance model output 124 as a function of impact datum 112. A "landing performance model output," as used in this disclosure, is a simulation and/or model of an electric aircraft that embodies an analytical and/or interactive visualization regarding the impact experience by the electric aircraft during landing and/or take-off. Landing performance model 124 may include a plurality of data describing the performance of the landing of the electric aircraft and integrated to landing performance model 124 as a part of impact datum 112. In some embodiments, computing device 116 may operate a flight simulator 120 configured to simulate and/or generate the simulation of landing performance model output 124. A "flight simulator," for the purpose of this disclosure, is a program or set of operations that simulate a model of the electric aircraft and its functions. A "virtual representation," for the purpose of this disclosure, is any model or simulation which is representative of a physical phenomenon such as the flying of the electric aircraft. For instance and without limitation, flight simulator 120 may be consistent with the flight simulator U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT" which is incorporated herein in its entirety. In a non-limiting embodiment, landing performance model output 124 may include, at least in part, a virtual representation. As described in this disclosure, a "virtual representation" includes any model or simulation accessible by computing device which is representative of a physical phenomenon, for example without limitation at least a part of an electric aircraft and its flight component 108 such as its landing gear. For instance and without limitation, the virtual representation may be consistent with virtual representation in U.S. patent application Ser. No. 17/348,916. In some cases, the virtual representation may be interactive with flight simulator 120.

With continued reference to FIG. 1, computing device 116 may be configured to generate a landing performance datum 128. A "landing performance datum," as used in this disclosure, is a determination of a collection of data describing the electric aircraft and its flight components such as a landing gear and the performance and quality of the landing gear. Landing performance datum 128 may include a collection of information describing the external forces the electric aircraft and its flight component 108 and/or landing gear experiences during landing and/or coming into contact with a surface such as a tarmac. For example and without limitation, sensor 104 and/or a strain gauge connected to flight component 108 and/or landing gear may measure the external forces and/or intensity of the cushioning of a mechanical portion of flight component 108 (e.g. high stress area, knee spring, etc.). Landing performance datum 128 may include comparisons and determinations related to the impact experienced by the electric aircraft and its flight component 108 based on previously measured landing performance datum of the electric aircraft, similar electric aircrafts, previous flight operations, and/or previously generated models. In another non-limiting embodiment, computing device 116 may determine landing performance datum 128 as a function of a comparison between landing performance model output 124 of the electric aircraft and a plurality of previously simulated landing performance model outputs, wherein the previously simulated landing performance model outputs were recorded and/or stored in an impact database 144. An "impact database," as used in this disclosure, is a data storage system used to store a plurality of datum generated and/or collected by an electric aircraft. Impact database 144 may be implemented, without limitation, as a relational database, a key-value retrieval database such as a NOSQL database, or any other format or structure for use as a database that a person skilled in the art would recognize as suitable upon review of the entirety of this disclosure. Impact database 144 may alternatively or additionally be implemented using a distributed data storage protocol and/or data structure, such as a distributed hash table or the like. Impact database 144 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in a non-limiting embodiment, impact database 144 may be local to the electric aircraft and/or onboard the electric aircraft. In another embodiment, impact database 144 may be located externally from the electric aircraft such as in the cloud. Impact database 144 may include a plurality of data tables configured to store every instance a landing performance datum is generated/determined. This is so, at least in part to create a robust data storage system of impact database 144. In another embodiment, determining landing performance datum 128 may include comparing a history of landing performance datums of the electric aircraft. Alternatively or additionally, in some embodiments, landing performance datum 128 may be determined by an impact force magnitude. Computing device 116 may be configured to transmit any datum such as landing performance datum 128 to a remote device. The remote device may include, but not limited to, a server, a cloud database, a cloud service, impact database 144, and/or any device and/or data storage system that is remotely located. In a non-limiting embodiment, the remote device may include user device 148

Still referring to FIG. 1, landing performance datum 128 may detect a hazardous instance 132. A "hazardous instance," as used in this disclosure, is an event in which one or more straining parameters denote an unsafe health state of flight component 108 such as the landing gear of the electric aircraft. Hazardous instance 132 may indicate repeated hard landings and/or potential damages of flight component 108. As used in this disclosure, "straining parameters" are parameters denoting the external forces experienced by landing/take-off involving flight components such as the landing gear. In some embodiments, straining parameters may include temperature, strain, force, and the like thereof. In another embodiment, straining parameters may include overloading, humidity, repeatability, EMI induced errors, hysteresis, linearity, zero shift with temperature, zero offset, etc. Alternatively or additionally, hazardous instance 132 may include a boolean determination that flight component 108 is degraded and/or damaged to a point where immediate attention to it is required. In a non-limiting embodiment, hazardous instance 132 may include information denoting too much movement and/or too little resistance by shock absorbers and/or retractable gears of flight component 108. In another embodiment, hazardous instance 132 may include a temperature detected by the strain gauge that is too high, indicating severe stress on flight component 108. In another example, hazardous instance 132 may include too much stress or strain detected by the strain gauge. In another example, landing performance datum 128 may include a poor health state of flight component 108, wherein the hazardous instance is determined as a function of checking the integrity of flight component 108. For example and without limitation, flight component 108 may experience a variety of wear and tear as a result of repeated hard landings, wherein an operator may physically check the integrity of flight component 108 and determine, to the operator's best judgement, the health state of flight component and/or whether flight component 108 denotes a hazardous instance. Alternatively or additionally, hazardous instance 132 may be determined as a function of the electric aircraft undergoing a fixed number of landings and/or hard landings. This is so, at least in part, to standardize a life cycle of flight component 108 such as its landing gear in order to avoid overusing it. Persons skilled in the art, upon reviewing the entirety of this disclosure, will be aware of the various embodiments denoting a potentially dangerous event related to the landing gears of the electric aircraft for purposes as described herein.

With continued reference to FIG. 1, hazardous instance 132 may be determined as a function of an impact threshold 136. An "impact threshold," as used in this disclosure is a level to which a flight component can be exposed to a certain amount of external force without adverse effects. In a non-limiting embodiment, impact threshold 136 may include upper and lower values representing a standard deviation in which the external forces applied onto flight component 108 may experience without causing concern. In another non-limiting embodiment, impact threshold 136 may include an upper value indicating a limit in which an external force exceeding that upper value will trigger and/or determine hazardous instance 132. In another non-limiting embodiment, impact threshold 136 may include a lower value indicating a limit in which an external force exceeding that lower value (from zero) will trigger and/or determine hazardous instance 132. For example and without limitation, the upper and lower values of impact threshold 136 may include ±3000 microstrain on the landing gear of the electric aircraft. In the event landing performance datum 128 indicates a microstrain exceeding ±3000, hazardous instance 132 may further be determined. In another non-limiting example, some impact datum exceeding the upper value of impact threshold 136 may indicate a hard landing. Computing device 116 may generate an alert datum 140 in the event the upper limit is reached and/or exceeded, indicating a greater probability of imminent and/or incremental damage to the electric aircraft. Persons skilled in the art, upon reviewing the entirety of this disclosure, will be aware of the various embodiments of parameters of a threshold for indicating some hazardous instance in the context of impact monitoring.

Still referring to FIG. 1, impact threshold 136 may be represented as a fuzzy set. For example and without limitation, the fuzzy set may include a linguistic variable representing impact severity, where membership in a fuzzy set representing a high or severe impact value may meet the threshold and/or represent a degree of severity to be used in determining how serious, hazardous, and/or potentially hazardous the impact was. An "impact severity," as used in this disclosure, is a measure and/or range denoting how severe an impact of the electric aircraft was and/or will be. The impact severity may include the threat levels. In a non-limiting embodiment, the fuzzy set and/or landing performance model may be generated as a function of an impact machine learning model. An "impact machine-learning model," as used in this disclosure, is any machine-learning model used to output the fuzzy set. Alternatively or additionally, the impact machine-learning model may output landing performance model output 124. In a non-limiting embodiment, the impact machine-learning model may be configured to tune the coefficients of the membership functions of the fuzzy set. The impact machine-learning model may receive an input from computing device 116 such as a tunable threshold parameter. In a non-limiting embodiment, the tunable threshold parameter may be retrieved from impact database 144. A "tunable threshold parameter," as used in this disclosure, is any impact threshold in which the range and/or limits are adjustable and/or adjusted based on flight component 108 and/or the landing gears. For example and without limitation, the electric aircraft may be fitted with a new and improved landing gear in which the impact threshold and/or impact severity is higher. For instance, the new and improved landing gear may be able to withstand greater instantaneous force and/or hard landing without resulting in serious or hazardous damage to itself of the electric aircraft compared to an older model of the landing gear or a landing gear with a long term of service, which may have a range that is a lower offset of the range of the new and improved landing gear, wherein the older model of the landing gear may be unable to withstand the instantaneous force and/or hard landing that the new and improved model may withstand. The impact machine-learning model may be trained using an impact training set. The impact training set may be received from impact database 144. An "impact training set," as used in this disclosure is a training set comprising some tunable threshold parameter correlated to the impact threshold best associated with the electric aircraft and its landing gear. In a non-limiting embodiment, the impact training set may include an element of data describing the landing gear correlated to an impact threshold for that landing gear. Persons skilled in the art, upon reviewing the entirety of this disclosure, will be aware of the various training sets used to train a machine-learning model for outputting the best matched impact threshold.

Still referring to FIG. 1, hazardous instance 132 may be determined as a function of a hazardous landing machine-learning model. A "hazardous landing machine-learning model," as used in this disclosure is any machine-learning model configured to output some hazardous instance. In a non-limiting embodiment, computing device 116 may train the hazardous landing machine-learning model using a hazardous instance training set. A "hazardous instance training set," as used in this disclosure, is a training set comprising a previously generated impact datum correlated to a previously determined hazardous instance. For example and without limitation, the impact training set may include information denoting some number of repeated hard landings of one or more electric aircraft and/or some value of microstrain measured by the strain gauge exceeding a safe limit correlated to a boolean determination of a hazardous instance, where such instances may have been input by users and/or measured in past flights by one or more aircraft. In a non-limiting embodiment, the hazardous landing machine-learning model may receive the impact threshold from the impact machine-learning model as an input to output the hazardous instance using the hazardous training set. Persons skilled in the art, upon reviewing the entirety of this disclosure, will be aware of the generation of a training set comprising past data correlated to a past output for purposes as described herein.

With continued reference to FIG. 1, computing device 116 may be configured to display landing performance datum 128 and/or hazardous instance on a user device 148. A "user device," for the purpose of this disclosure, is any additional computing device, such as a mobile device, laptop, desktop computer, or the like. In a non-limiting embodiment, user device 148 may be a computer and/or smart phone operated by a user in a remote location. User device 148 may include, without limitation, a display in communication with computing device 116; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device 148 may include a graphical user interface (GUI) configured to display any information from computing device 116 and/or any computing device. In a non-limiting embodiment, user device 148 may be utilized by a user located remotely from the electric aircraft in order to analyze data from the electric aircraft in a remote location. Alternatively or additionally, user device 148 may be located inside the electric aircraft for a pilot to interact with. For example and without limitation, user device 148 may include a pilot device incorporated into the cockpit of the electric aircraft. A "pilot device," for the purpose of this disclosure, is an interactive and functional electronic instrument within a physical cockpit used by a pilot that provides crucial information in flight. In a non-limiting embodiment, the pilot device may provide information of the electric aircraft the pilot is piloting such as, but not limited to, altitude, airspeed, vertical speed, heading and much more other crucial information in flight. In a non-limiting embodiment, the pilot device may include any computing device consistently with the entirety of this disclosure. In another non-limiting embodiment, the pilot device may be configured to support avionics and/or simulated avionics to which a persons skilled in the art, upon reviewing the entirety of this disclosure, will be aware of the implementation of avionics for the purpose of a simulated environment. In a non-limiting embodiment, the pilot device may include a functional primary flight display (PFD), a functional electronic instrument system (EFIS), a functional electronic horizontal situation indicator (EHSI), and the like thereof. In a non-limiting embodiment, the simulated avionics may include the equipment and electronics to support communication, navigation, multi-system management, and the like thereof.

With continued reference to FIG. 1, user device 148 may include a graphical user interface (GUI), which may include any displays as described above, including without limitation a concave screen. In a non-limiting embodiment, the GUI may be configured to display visual indicators that may be used with electric aircraft, such as but not limited to, altitude, wind speed, aircraft speed, roll, yaw, pitch, flight component status, torque of a flight component, temperature of a battery, power output of a battery, remaining battery charge, battery health, and/or fuel supply. In another non-limiting embodiment, the GUI may display a flight plan in graphical form. Graphical form may include a two-dimensional plot of two variables that represent data received by the controller, such as past maneuvers and predicted future maneuvers. In one embodiment, GUI may also display a user's and/or a pilot's input in real-time. GUI may be configured to show a primary flight display. The primary flight display may include an airspeed indicator, altitude indicator, slip skid indicator, altimeter, vertical speed indicator (VSI), turn indicator, horizontal situation indicator, and/or a turn rate indicator. In some embodiments, the primary flight display may include a general cruising speed, a ground airspeed, a flap range, a best angle of climb speed, a rotation speed and/or a best rate of climb speed. The PFD may include a transponder code, air temperature, waypoint, distance to waypoint, time and/or compass. In some embodiments, user device 148 may display a virtual representation of the electric aircraft and flight component 108, highlighting flight component 108 with bright colors, lines, patterns, and the like thereof. User device 148 may indicate hazardous instance 132 surrounding flight component 108 and display quantitative and/or qualitative information describing it. For example and without limitation, user device 148 may display strain parameters indicating the quality and/or performance of flight component 108 has exceeded impact threshold 136, in which impact threshold 136 indicates a range of values for which the strain parameters must maintain to be regarded as safe and operable. In some embodiments, user device 148 may display an alert datum 140 indicating the potential danger of flight component 108 and its damage or degradation as a function of hazardous instance 132.

With continued reference to FIG. 1, computing device 116 may be configured to alert a user of hazardous instance 132. In a non-limiting embodiment, computing device 116 may generate an alert datum 140 as a function of hazardous instance 132 and/or landing performance datum 128 which may include an alert. An "alert datum," as used in this disclosure, is a collection of information describing a level of intensity and/or priority of an instance of a potentially dangerous event. Alert datum 140 may include a quick notification of a potentially dangerous event. In a non-limiting embodiment, alert datum 140 may include a range of alerts comprising of a combination of sounds and/or images indicating hazardous instance 132 at various threat levels. A "threat level," as used in this disclosure is an instance denoting a chance of a hazardous event. The various threat levels may indicate a range of a low chance of a hazardous event to a high chance of a hazardous event. In a non-limiting embodiment, alert datum 140 may include a warning symbol to a user and/or pilot, notifying them that flight component 108 is potentially dangerous as a function of repeated hard landings, degraded materials resulting from long term use, and the like thereof. A "warning symbol," for the purpose of this disclosure, is an indicative sign of a potentially dangerous event associated with flight component 108 of the electric aircraft. The warning symbol may include an abbreviation, a sign, or combination thereof. The warning symbol may highlight itself in blinking form, distinct colors, or combination thereof. Examples of warning symbols may indicate, but not limited to, a malfunction or failure of at least flight component 108, landing gears, components of the landing gears, and the like thereof. The warning symbol or plurality of warning symbols may dissuade the pilot from undertaking a disadvantageous action. Examples of disadvantageous actions include, but not limited to, at least actions that may harm the electric aircraft, the flight components, actions that may produce collateral damage, and the like. In a non-limiting embodiment, user device 148 may include a locator component. A "locator component," as used in this disclosure, is a device and/or component that a pilot can use to point a cursor at a point on the GUI of user device 148. The locator component may include without limitation a wired or wireless mouse, a touchpad, a touchscreen, a game controller, or the like. The locator component may include a motion-capture device, such as without limitation a device that tracks motion of offsite surgeon's hands optically and/or using a sensor of motion, which may be implemented in any way suitable for implementation of sensor 104 as described above.

Still referring to FIG. 1, alert datum 140 may include one or more classifications of severity of hazardous instance 132. For example and without limitation, alert datum 140 may indicate through user device 148 that flight component 108 may pose some threat to the electric aircraft as a function of predictive models produced in part by computing device 116. Computing device 116 may generate alert datum 140 which may include a mild level of priority. In another non-limiting example, flight component 108 may experience a hard landing causing severe damage and/or degradation to it. The damage and/or degradation may have exceeded any predicted damage and/or degradation computing device 116 may have generated. Computing device 116 may be configured to generate alert datum 140 comprising a high level of priority for immediate action to be taken on flight component 108. Persons skilled in the art, upon reviewing the entirety of this disclosure, will be aware of the various classifications and priorities for potential damage in the context of monitoring impact for an electric aircraft.

With continued reference to FIG. 1, computing device 116 may be configured to initiate an emergency landing as a function of alert datum 140. Alert datum 140 may include a serious hazardous instance 132 to flight component 108. In a non-limiting embodiment, the electric aircraft may be cruising in the air. The electric aircraft may experience an unexpected event in which a component of flight component 108 such as a landing gear detaches from the electric aircraft mid-flight. Sensor 104 may detect this incident in which alert datum 140 may be generated and alert the pilot and/or remotely located user of a high priority event. For instance and without limitation, computing device 116 may generate an emergency landing to be taken place in order to respond to this hazardous instance 132. In a non-limiting embodiment, computing device 116 may generate a program and/or button for which a pilot and/or user to interact with via the GUI of user device 148 to begin the emergency landing. Persons skilled in the art, upon reviewing the entirety of this disclosure, will be aware of the various embodiments of emergency protocols and the causes of them in the context of landing gear malfunctions.

Figure 2:
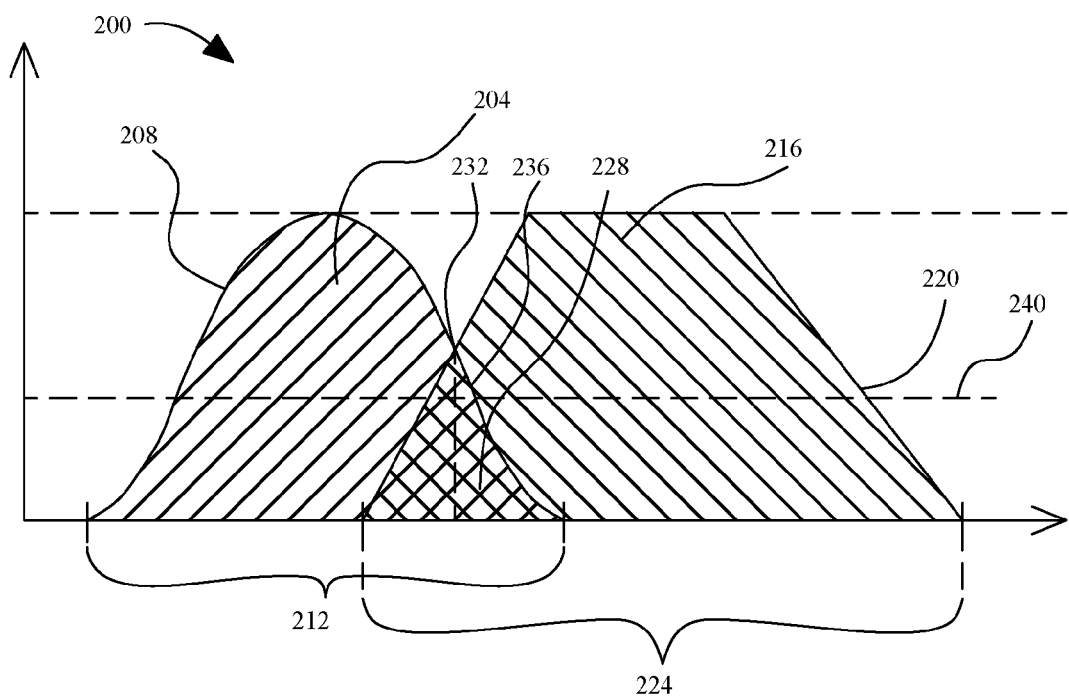
FIG. 2 is a diagrammatic representation of an exemplary embodiments of fuzzy sets for an impact threshold.

Now referring to FIG. 2, an exemplary embodiment of fuzzy set comparison 200 for an impact threshold is illustrated. The impact threshold may be consistent with impact threshold 136 in FIG. 1. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 204 may represent any value or combination of values as described above, including predictive prevalence value, probabilistic outcome, any resource datum, any niche datum, and/or any combination of the above. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 228 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, threshold may indicate a sufficient degree of overlap between probabilistic outcomes and/or predictive prevalence values for combination to occur as described above. There may be multiple thresholds; for instance, a second threshold may indicate a sufficient match for purposes impact threshold 136 as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if landing performance datum 128 and a previous landing performance datum from history of landing performance datums have fuzzy sets matching a probabilistic outcome fuzzy set by having a degree of overlap exceeding threshold 136 and/or upper/lower values, computing device 116 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple landing performance datums 128 may be presented to a user in order of ranking.

Figure 3:
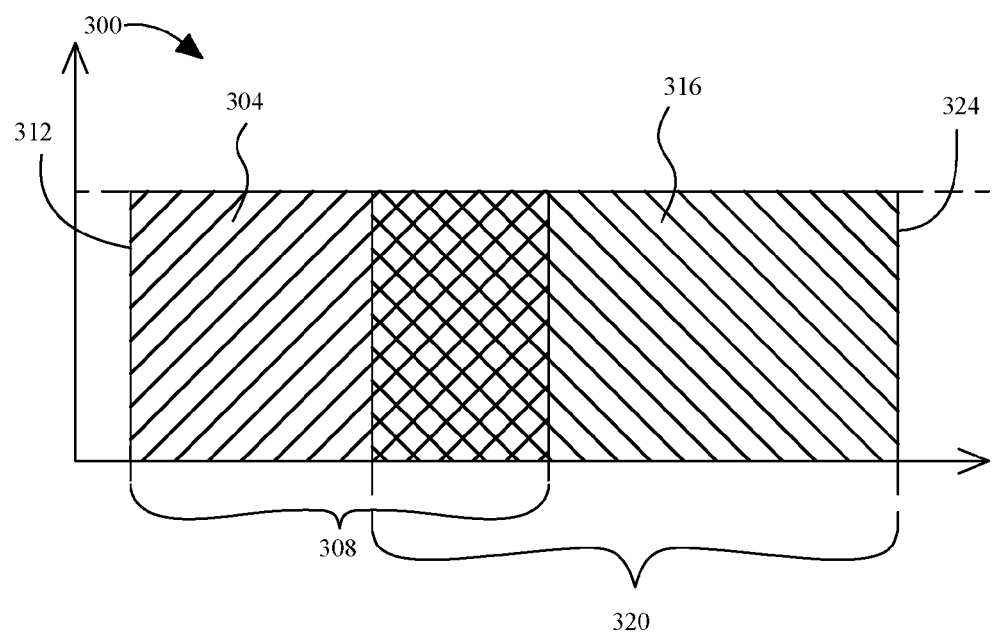
FIG. 3 is a diagrammatic representation of an exemplary embodiments of bivalent sets for an impact threshold.

Referring now to FIG. 3, an exemplary embodiment of comparison of bivalent sets on ranges for an impact threshold is illustrated. A first bivalent set 304 may be defined on a first range 308, which may have any form suitable for use as a first range for a fuzzy set as described above. In an embodiment, first bivalent set 304 may be defined according to a first characteristic function 312, which may include, without limitation, a step function having output values on a probability interval such as [0,1] or the like; step function may have an output representing 100% or probability of 1 for values falling on first range 308 and zero or a representation of zero probability for values not on first range 308. A second bivalent set 316 may be defined on a second range 320, which may include any range suitable for use as first range 308. Second bivalent set 316 may be defined by a second characteristic function 324, which may include any function suitable for use as first characteristic function 312. In an embodiment a match between first bivalent set 304 and second bivalent set 316 may be established where first range 308 intersects second range 320, and/or where first characteristic function 312 and second characteristic function 324 share at least one point in first range 308 and second range 320 at which both first characteristic function 312 and second characteristic function 324 are non-zero.

Figure 4:
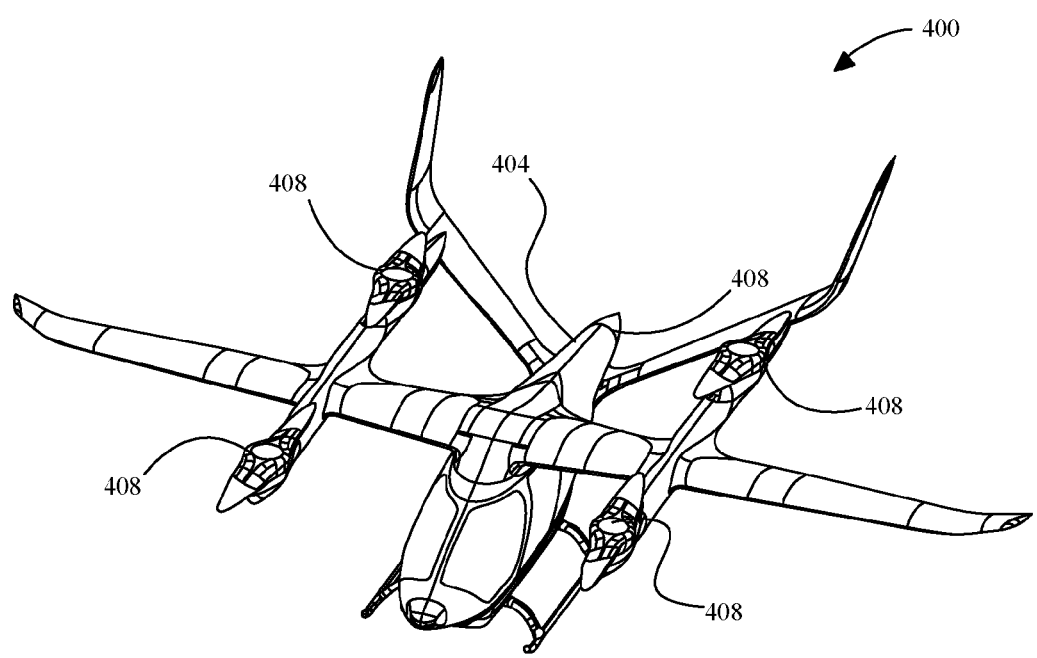
FIG. 4 is a schematic representation of an exemplary electric aircraft.

Referring now to FIG. 4, an exemplary embodiment of an aircraft 400 is illustrated. In an embodiment, aircraft 400 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 400 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, and titled "AN INTEGRATED ELECTRIC PROPULSION ASSEMBLY," the entirety of which is incorporated herein by reference.

With continued reference to FIG. 4, as used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 400, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight," as described herein, is where the aircraft is capable of flight using wings and/or foils that generate lift caused by the aircraft's forward airspeed and the shape of the wings and/or foils, such as airplane-style flight.

Still referring to FIG. 4, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 404 may include structural elements that physically support a shape and structure of an aircraft. Structural elements may take a plurality of forms, alone or in combination with other types. Structural elements may vary depending on a construction type of aircraft such as without limitation a fuselage 404. Fuselage 404 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 4, aircraft fuselage 404 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 404 orthogonal to a longitudinal (nose to tail) axis of the aircraft and may form a general shape of fuselage 404. A former may include differing cross-sectional shapes at differing locations along fuselage 404, as the former is the structural element that informs the overall shape of a fuselage 404 curvature. In embodiments, aircraft skin may be anchored to formers and strings such that the outer mold line of a volume encapsulated by formers and stringers includes the same shape as aircraft 400 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

Still referring to FIG. 4, aircraft 400 may include a plurality of flight components 408. As used in this disclosure a "flight component" is a component that promotes flight and guidance of an aircraft. In an embodiment, flight component 408 may be mechanically coupled to an aircraft. Plurality of flight components 408 may include flight component 108. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 4, plurality of flight components 408 may include at least a landing gear. The landing gear may be consistent with any landing gear as described in the entirety of this disclosure. In another embodiment, plurality of flight components 408 may include at least a propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis.

In an embodiment, and still referring to FIG. 4, plurality of flight components 408 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 4, plurality of flight components 408 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1045 N to force aircraft to in a horizontal direction along the longitudinal axis. As a further non-limiting example, pusher component may twist and/or rotate to pull air behind it and, at the same time, push aircraft 400 forward with an equal amount of force. In an embodiment, and without limitation, the more air forced behind aircraft, the greater the thrust force with which aircraft 400 is pushed horizontally will be. In another embodiment, and without limitation, forward thrust may force aircraft 400 through the medium of relative air. Additionally or alternatively, plurality of flight components 408 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 5:
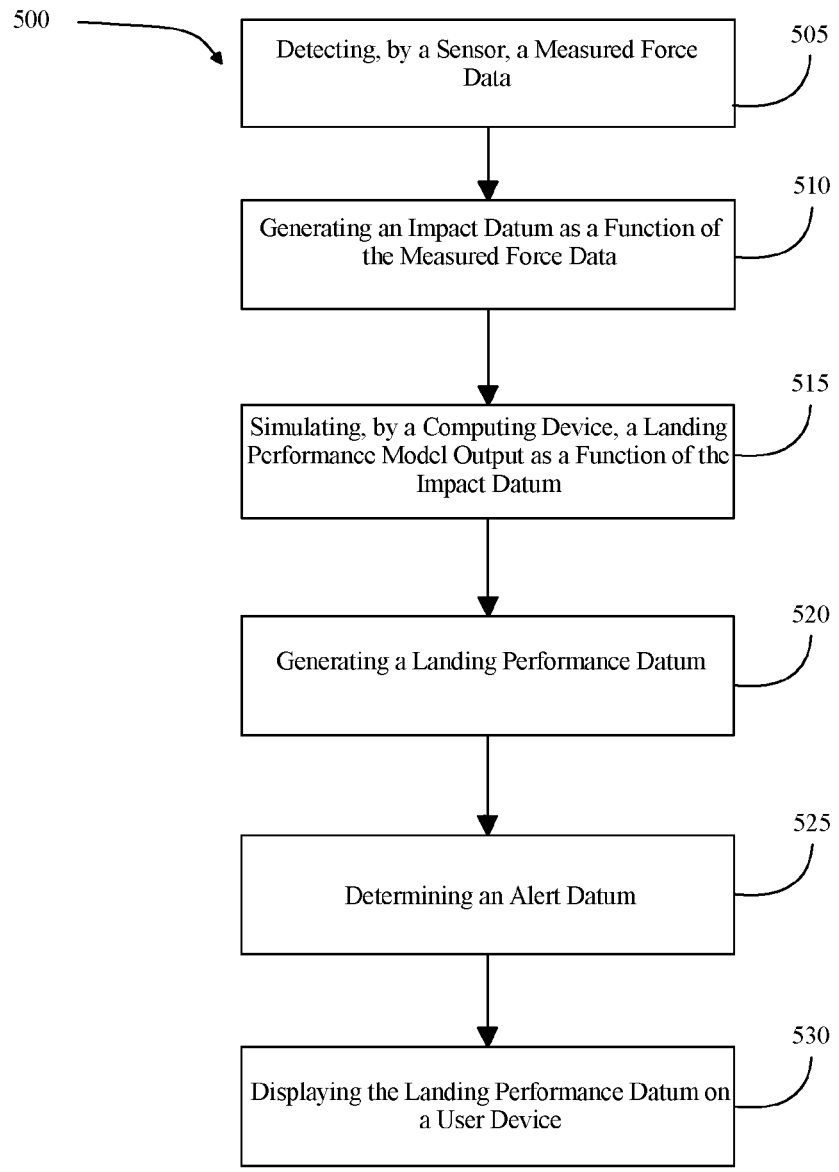
FIG. 5 is flow diagram of an exemplary embodiment of a method for monitoring impact on an electric aircraft.

Referring now to FIG. 5, a flow diagram of an exemplary embodiment of a method 500 for monitoring impact on an electric aircraft is provided. Method 500, at step 505, may include detecting, by a sensor communicatively connected to a flight component, a measured force datum. The sensor may include any sensor as described herein. The measured force datum may include any measured force datum as described herein. The flight component may be consistent with any flight component as described in the entirety of this disclosure. In a non-limiting embodiment, step 505 may include detecting, by a strain gauge connected to a landing gear of an electric aircraft, the measured force datum. In a non-limiting embodiment, the electric aircraft may include an electric vertical take-off and landing (eVTOL) aircraft. Persons skilled in the art, upon reviewing the entirety of this disclosure, will be aware of the various methods for measuring data from sensing devices in the context of an electric aircraft.

Still referring to FIG. 5, method 500, at step 510, may include generating an impact datum as a function of the measured force datum. The impact datum may be consistent with any impact datum as described in the entirety of this disclosure. In a non-limiting embodiment, the sensor may include any computing device configured to convert electrical signals into readable data. Persons skilled in the art, upon reviewing the entirety of this disclosure, will be aware of the various methods of converting signals representing data into a collection of information for analysis purposes in the context of monitoring impact of an electric aircraft.

With continued reference to FIG. 5, method 500, at step 515, may include simulating, by a computing device, a landing performance model output as a function of the impact datum. The computing device may be consistent with any computing device as described in the entirety of this disclosure. The landing performance model output may be consistent with any landing performance output as described herein. In a non-limiting embodiment, method 500 may include receiving the impact datum as a function of a plurality of physical CAN bus units. In another embodiment, method 500 may include simulating the landing performance model output as a function of a flight simulator. The flight simulator may include any flight simulator as described herein. In a non-limiting embodiment, the method may include generating a virtual representation of the electric aircraft and/or the flight component such as the landing gear as a function of the flight simulator. The virtual representation may include any virtual representation as described herein. The computing device may receive parameters from the impact datum and generate a model and/or virtual representation of the impact datum. In a non-limiting embodiment, the flight simulator may simulate a model that visualizes potential landings of the electric aircraft and the effects of the landing gears, indicating a change in performance.

Still referring to FIG. 5, method 500, at step 520, may include generating a landing performance datum as a function of a comparison between the landing performance model output of the electric aircraft and a plurality of landing performance model outputs from an impact database. The landing performance datum may be consistent with any landing performance datum as described in the entirety of this disclosure. In a non-limiting embodiment, determining the landing performance datum may include identifying and/or determining a hazardous instance. The hazardous instance may include any hazardous instance as described herein. In a non-limiting embodiment, the comparison may include comparing a history of previously generated landing performance datums wherein the history of landing performance datums are recorded and/or stored in the impact database. The impact database may include any impact database as described herein. Method 500 may include transmitting any datum such as the landing performance datum to remote device, wherein transmitting further includes storing any datum in a remotely located server, a cloud database, impact database, and the like thereof, in a non-limiting embodiment, the hazardous instance may be determined as a function of an impact threshold. The impact threshold may be consistent with any impact threshold as described in the entirety of this disclosure.

With continued reference to FIG. 5, method 500, at step 525, may include determining an alert datum as a function of the landing performance datum. An alert datum may be consistent with any alert datum as described herein. The alert datum may include an alert that indicates a level of severity of the impact of landing, such as a hard landing.

With continued reference to FIG. 5, method 500, at step 530, may include displaying the landing performance datum on a user device. The user device may include any user device as described herein. In a non-limiting embodiment, method 500 may include displaying the landing performance datum and/or the hazardous instance. The displaying me be done on a pilot device located inside the cockpit of the electric aircraft. The pilot device may include any pilot device as described herein. In a non-limiting embodiment, method 500 may include initiating an emergency landing as a function of the alert in the even the electric aircraft is in the air. The computing device may have some pre-programmed command to support any emergency landing in which a user and/or pilot may interact with a GUI on the user device to perform the landing. Persons skilled in the art, upon reviewing the entirety of this disclosure, will be aware of the various methods for displaying information and performing emergency landings in the context of monitoring impact of the landing gears of an electric aircraft.

Figure 6:
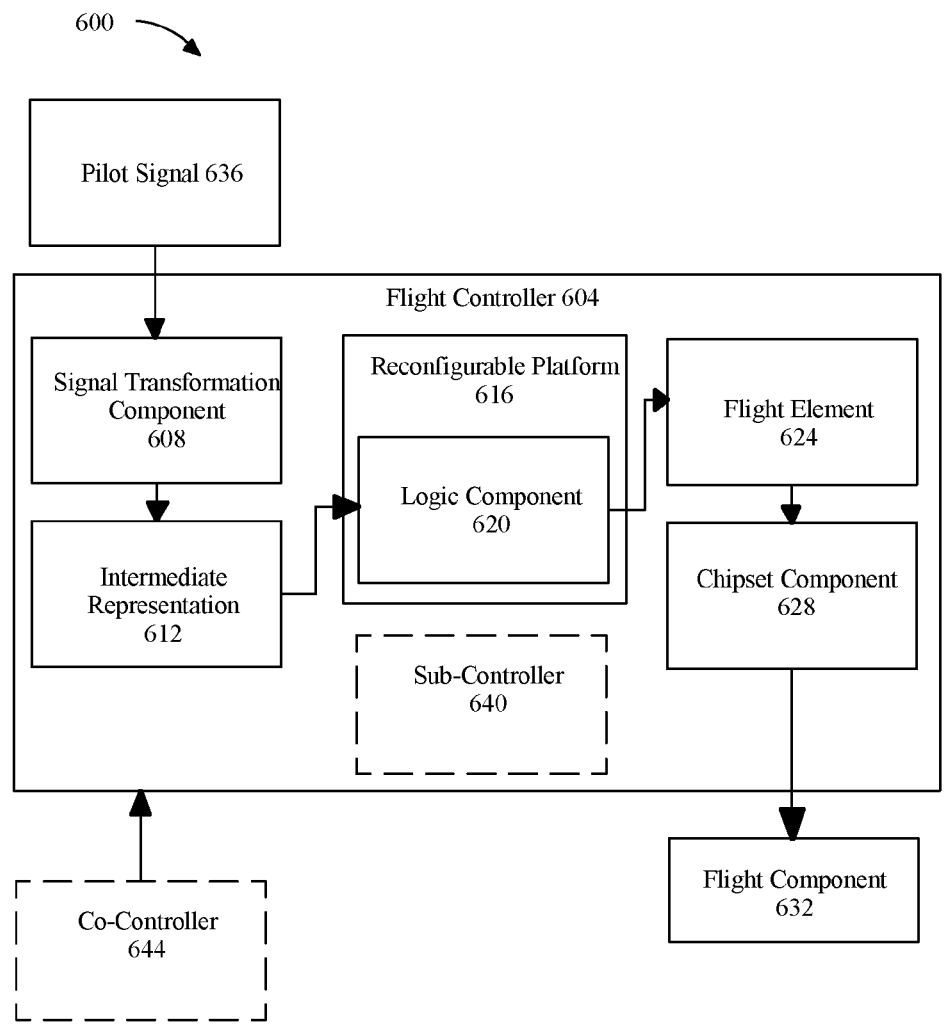
FIG. 6 is a block diagram illustrating an exemplary flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 6-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field/with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an autocode, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above. In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
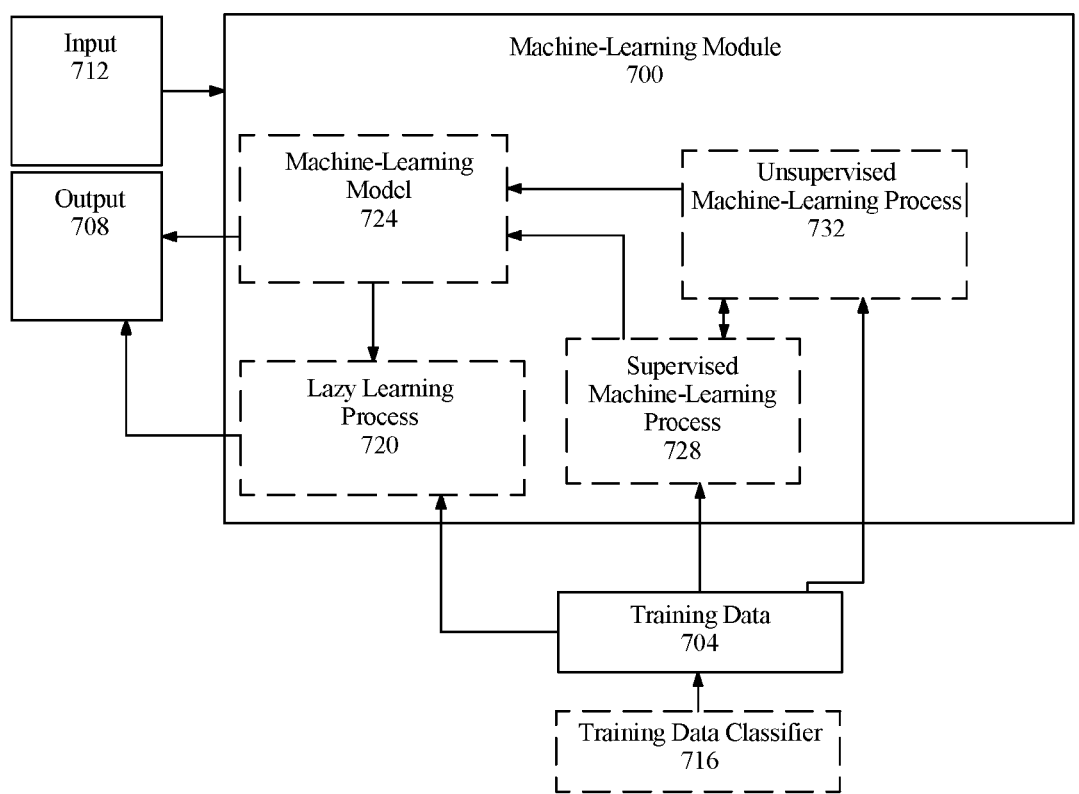
FIG. 7 illustrates a block diagram of an exemplary machine-learning process.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example, an impact datum may be an input used to output a landing performance datum and/or a hazardous instance.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to the various levels of severity and/or priority based on the hazardous instance for which a subset of training data may be selected for the generating of unique alerts.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
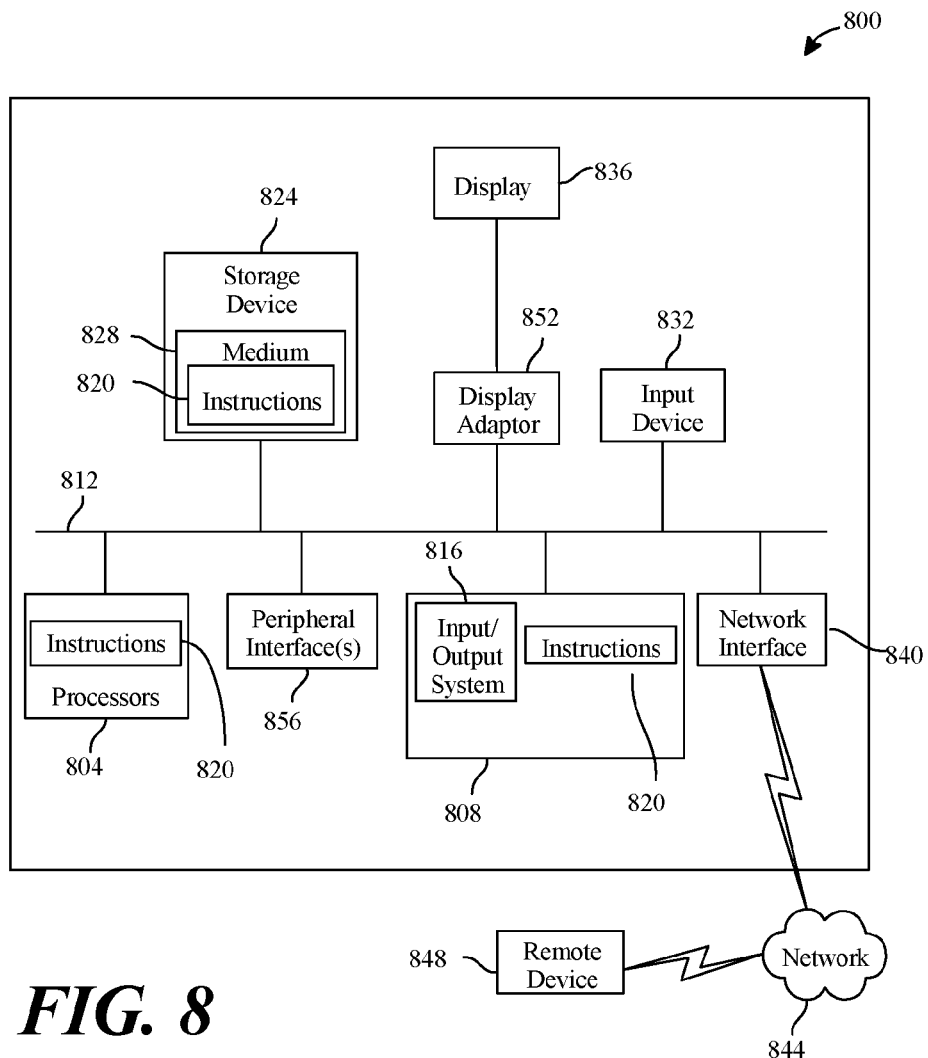
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for monitoring impact on an aircraft, the system comprising:
   a flight component;
   a strain gauge connected to the flight component, wherein the strain gauge is configured to measure impact data associated with the flight component during each landing by the aircraft; and
   a computing device communicably coupled to the strain gauge and configured to:
      determine a hazardous instance for the flight component based on an impact threshold and a change in the impact data measured over a plurality of landings by the aircraft,
      determine an alert based on the hazardous instance, and
      initiate display of the alert on a graphical user interface.

2. The system of claim 1, wherein the alert includes a sound or image indicating the hazardous instance and a threat level of the hazardous instance.

3. The system of claim 1, wherein the flight component comprises a landing gear.

4. The system of claim 3, wherein the computing device is further configured to initiate an emergency landing based on the alert.

5. The system of claim 1, wherein the impact data that includes a strain on the flight component during each landing of the aircraft,
   the computing device further configured to:
      determine the hazardous instance for the flight component based on the impact threshold and a change in the strain on the flight component based on the impact data for each landing of the aircraft measured by the strain gauge.

6. The system of claim 5, wherein the computing device is further configured to:
   determine the change in the strain on the flight component by determining performance data for the flight component based on the impact data, and
   determine the hazardous instance for the flight component by processing the performance data and a tunable threshold parameter through an impact machine-learning model.

7. The system of claim 6, wherein the tunable threshold parameter adjusts the impact threshold based on the flight component.

8. The system of claim 1, wherein the impact data further includes force, torque, kinetic energy, or pressure experienced by the flight component during each takeoff and landing of the aircraft.

9. The system of claim 1, wherein the impact data includes an intensity of a cushioning of a mechanical portion of the flight component.

10. The system of claim 1, wherein the hazardous instance includes damage to or a degrading of the flight component.

11. The system of claim 1, wherein the impact data includes a straining parameter denoting an external force experienced by the flight component, and the hazardous instance is an event in which the straining parameter denotes an unsafe health state of the flight component.

12. The system of claim 1, wherein the hazardous instance is a hard landing when the change in the impact data exceeds an upper value of the impact threshold.

13. The system of claim 1, wherein the impact threshold is a fuzzy set representing a degree of impact severity.

14. A method comprising:
measuring, via a strain gauge during a plurality of landings by an aircraft, impact data associated with a flight component coupled to the aircraft;
determining, via an electronic processor communicably coupled to the strain gauge, a hazardous instance for the flight component based on an impact threshold and a change in the impact data measured over the plurality of landings by the aircraft;
determining, via the electronic processor, an alert based on the hazardous instance, and
providing, via the electronic processor, the alert to a display.

15. The method of claim 14, wherein the display is within a cockpit of the aircraft.

16. The method of claim 14, wherein the impact data that includes a strain on the flight component during each landing of the aircraft, the method further comprising:
determining, via the electronic processor, the hazardous instance for the flight component based on the impact threshold and a change in the strain on the flight component based on the impact data for each landing of the aircraft measured by the strain gauge.

17. The method of claim 16, further comprising:
determining, via the electronic processor, the change in the strain on the flight component by determining performance data for the flight component based on the impact data, and
determining, via the electronic processor, the hazardous instance for the flight component by processing the performance data and a tunable threshold parameter through an impact machine-learning model.

18. The method of claim 17, wherein the tunable threshold parameter adjusts the impact threshold based on the flight component.

19. The method of claim 14, wherein the hazardous instance includes damage to or a degrading of the flight component.

20. The method of claim 14, wherein the impact data includes a straining parameter denoting an external force experienced by the flight component, and the hazardous instance is an event in which the straining parameter denotes an unsafe health state of the flight component.

* * * * *